INVENTOR.
NILS HOGLUND

July 20, 1965   N. HOGLUND   3,195,281
APPARATUS FOR FORMING CONTOURS ON WORK PIECES
Filed April 25, 1963   4 Sheets-Sheet 3

INVENTOR.
NILS HOGLUND
BY
William A. Zalesak
Attorney

July 20, 1965  N. HOGLUND  3,195,281
APPARATUS FOR FORMING CONTOURS ON WORK PIECES
Filed April 25, 1963  4 Sheets-Sheet 4

INVENTOR.
NILS HOGLUND
BY
William G. Zalesak
Attorney

United States Patent Office 3,195,281
Patented July 20, 1965

3,195,281
APPARATUS FOR FORMING CONTOURS ON
WORK PIECES
Nils Hoglund, 296 Hartshorn Drive, Short Hills, N.J.
Filed Apr. 25, 1963, Ser. No. 275,756
9 Claims. (Cl. 51—233)

My invention relates to apparatus for grinding contours on parts by means of a radius contoured grinding wheel.

A conventional contour grinding apparatus employs a grinding wheel having a contour formed thereon by means of a diamond contour wheel dresser. In this type of apparatus occasional dressing with the diamond dressing tool will maintain the contour on the grinding wheel with sufficient accuracy.

However, in certain applications, for example, where it is necessary to grind contours on hard material such as carbide or ceramic surfaces, the only practical means for grinding these surfaces is a diamond grinding wheel. Such diamond grinding wheels are quite expensive. Diamond grinding wheels shaped to any kind of form or contour are prohibitively expensive. Further, it is practically impossible to shape a diamond wheel to an accurate contour profile.

It is therefore an object of my invention to produce an apparatus for forming contours on hard surfaces, and in which the conventional contoured grinding wheel is dispensed with.

A further and more specific object of my invention is to provide a variable contour generator in which the work piece is moved past a radius formed diamond grinding wheel in a path corresponding to that necessary to produce the contour to be ground.

Briefly, apparatus made according to my invention includes a base upon which is mounted a slidable housing. Slidably mounted within the housing is a first cam slide supporting on one side a feed cam and on the other a contour cam. The feed cam contacts an adjustable follower mounted on the base. A biasing spring coupled between the base and the housing maintains the feed cam and follower in contact with each other.

A hydraulically operated piston on the housing is connected to the cam slide and causes movement of the housing back and forth on the base.

A transfer and ratio cam slide on the housing and movable transversely of the first cam slide carries a follower on one side in contact with the contour cam and the transfer cam on the other side. A third slide or ratio cam slide movable parallel to the first slide has a follower at each end. One of the followers is maintained in contact with the transfer cam by spring biasing means connected to the third slide and the housing.

Mounted at one end of the housing is a fourth or work piece supporting slide having means for supporting a work piece. This last slide is provided with a ratio cam in contact with the other follower on the third slide. The fourth slide and its associated elements have sufficient weight to keep its cam and associated follower in contact.

As the hydraulic cylinder is operated it causes the housing to move transversely of the grinding wheel and the work piece supporting slide to move up and down with the work piece. The grinding wheel or the apparatus made according to my invention and mounted on a movable table is moved simultaneously back and forth so that the grinding wheel and work piece move transversely of each other thus providing the desired contour. Moving the work piece, if it is a small part, results in faster operation than moving the grinding wheel and its associated apparatus.

Referring to the drawings.

Figure 1:
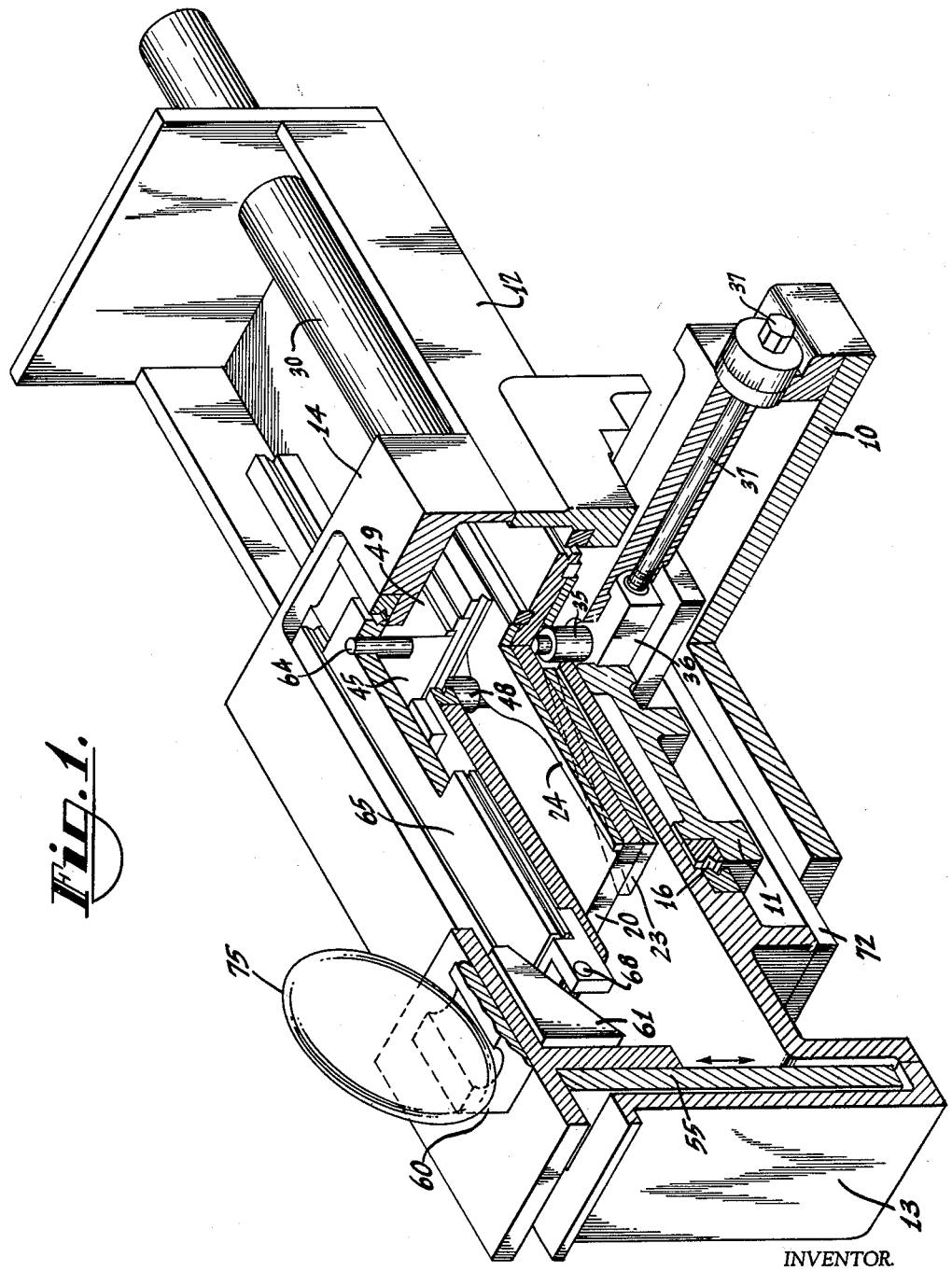
FIG. 1 is a perspective schematic, partially in section, of apparatus made according to my invention.

Referring to the drawings apparatus made according to my invention includes a base plate 10, having a bridge support 11 secured thereto. A housing member 12 having an end compartment 13 and a secondary housing 14 is slidably mounted on the bridge member 11 by means of ball bearing assemblies 16 and 17 to move transversely of a grinding wheel, the underside of the housing having the compartment 15 in which bridge support 11 is received.

Slidably mounted within the housing 12 is a cam slide 20 mounted on ball bearing assemblies 21 and 22. Secured to the underside of slide 20 is a feed cam 23 and to its other side contour cam 24, butted against the keys 25 and 26. The slide 20 is connected to a hydraulically operated cylinder 30 mounted in the housing 12. It is connected to slide 20 by piston rod 31 and bracket 32.

Figure 2:
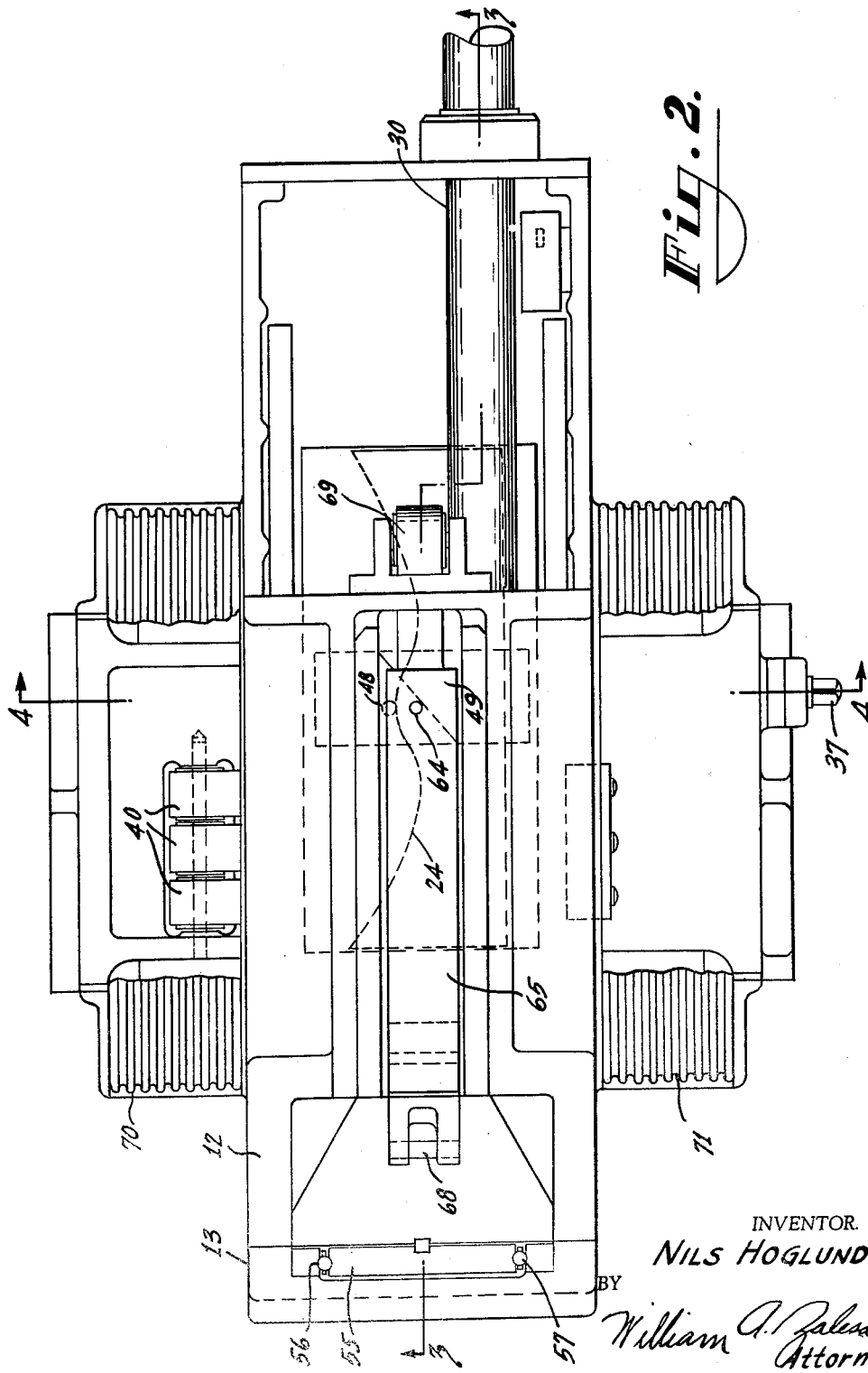
FIG. 2 is a plan view with the cover and one dust shield removed of the apparatus shown in FIG. 1.
Figure 3:
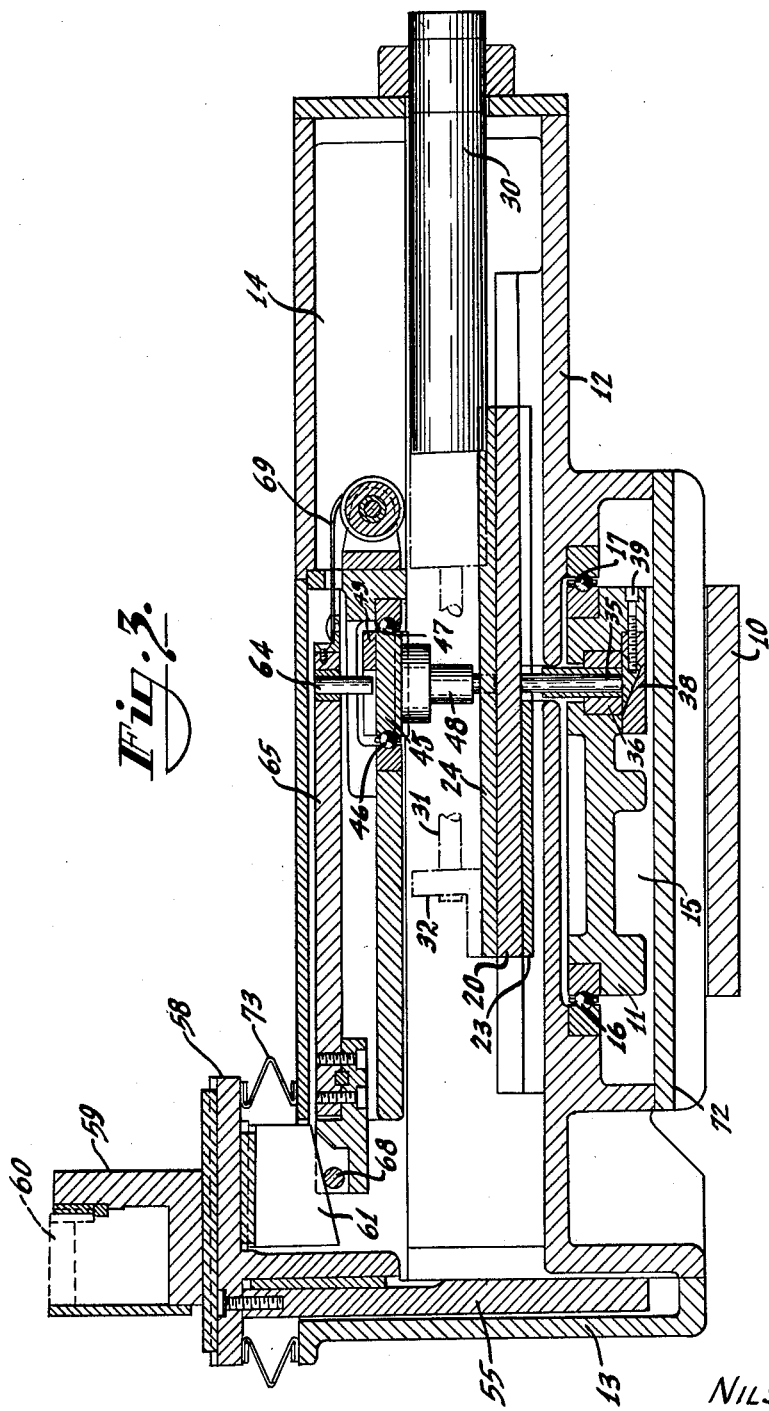
FIG. 3 is a section taken along the line 3—3 of FIG. 2.
Figure 4:
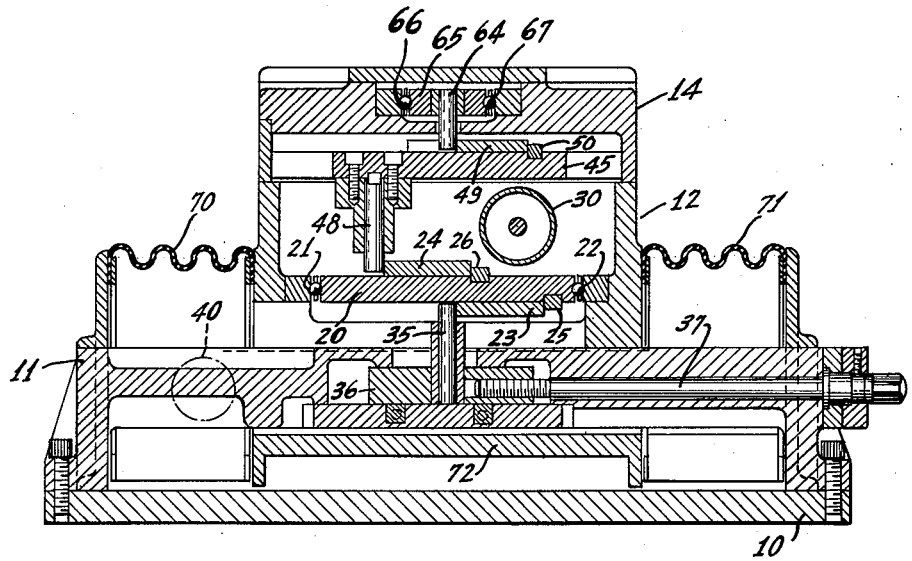
FIG. 4 is a section taken along the line 4—4 of FIG. 2.

Adjustably supported on the bridge member 11, is the follower 35, mounted in the slidable block 36, which can be adjusted by the screw 37. Once adjusted the block can be locked by wedge 38 and screws 39. Follower 35 contacts the feed cam 23, the cam and follower being maintained in contact by means of biasing springs 40. By adjusting screw 37, the housing may be accurately positioned to place the work piece where desired for grinding operations. When piston 30 is operated it moves slide 20 back and forth causing the housing 12 to move from right to left as viewed in FIGS. 1 and 2, that is toward and from the viewer as viewed in FIG. 3.

A transfer or ratio cam slide 45 is slidably mounted in the secondary housing by means of ball bearing assemblies 46 and 47. This slide carries the contour cam follower 48 which contacts the contour cam 24. Also carried by the slide 45 is the ratio or transfer cam 49, butted against key 50. Thus, movement of the slide 45 is governed by the contour on contour cam 24.

Mounted within the end compartment 13 of the housing is the work piece supporting slide 55 slidably mounted in ball bearing assemblies 56 and 57. A work supporting member or platen 58 is provided with a work clamping member 59 for holding a work piece 60. Supported on the platen is a secondary ratio cam 61.

To cause the platen 58 and work piece 60 to trace a path in accordance with the contour cam 24, I provide another slide 65 slidably mounted in ball bearing assemblies 66 and 67. At one end is a follower 64 which contacts the cam 49. At the other end of slide 65 is the follower 68 which contacts the cam 61. A biasing spring 69 keeps the cam 49 and follower 67 in contact thus forcing slide 45 to the right (FIG. 3) and keeping follower 48 in contact with the cam 24. The weight of slide 55, platen 58 and work piece 60 is sufficient to maintain cam 61 and follower 68 in contact.

To shield all bearing surfaces and ball bearing assemblies from dust and dirt, I provide bellows-like dust shields 70 and 71 connected between the housing 12 and the bridge support 11, and a dust shield 72 beneath the housing 12 which closes the underside of compartment 15. I also provide a bellows shield 73 between the secondary housing 14 and platen 58.

In operations the hydraulic cylinder 30 may be energized; utilizing automatic controls, not shown. The automatic controls control valves for admitting fluid under pressure to opposite sides of the piston head of cylinder 30 to cause the rod 31 to move slide 20 back and forth. As the slide is moved from its extreme right position as viewed in FIGS. 1 and 2, to the left, since the feed cam 23 is tapered, the biasing springs 40 will pull the housing away from the viewer. Thus, the housing moves the work piece 60 parallel to the axis of rotation of the grinding wheel 75. The grinding wheel is a radius formed diamond grinding wheel; that is, a wheel which has a single radius.

During movement of slide 20 transversely of the movement of the housing, the follower 48 follows the contour of the contour cam 24, thus, causing movement of the transfer slide 45 as dictated by the contour cam 24. This action is transferred to the work supporting slide 55 through slide 65 provided with the followers 64 and 68 and cam 61.

The angles of feed cam 16, transfer cam 49, and secondary cam 61 can be changed to obtain any ratio of movement desired both vertically and transversely. Obviously, the contour to be ground can also be changed by merely changing the contour on the contour cam 24 or the contours on any of the cams. All of these cams can be readily changed.

Mechanism made in accordance with my invention can make contours of innumerable forms and sizes. It is well balanced against vibration and well protected against grit and dust thereby increasing the life of the wearing parts of the apparatus.

What is claimed is:

1. Apparatus for holding and moving a work piece relative to a radius contoured grinding wheel for forming a contour on said work piece, including a supporting member, a housing slidably mounted on said supporting member, a first slide on said housing having a feed cam on one side thereof and a contour cam on the other side thereof, a follower on said supporting member in contact with said feed cam, a second slide on said housing and movable transversely of said first slide and having a follower on one side thereof in contact with said contour cam and a transfer cam in the other side thereof, a third slide on said housing movable parallel to said first slide and having a follower at each end thereof, one of said followers on said third slide contacting said transfer cam, a work support slidably mounted on said housing and movable transversely of the movement of said first and third slides, a ratio cam on said work support, the other of the followers on said third slide contacting said ratio cam.

2. Apparatus for holding and moving a work piece relative to a radius contoured grinding wheel for forming a contour on said work piece, including a supporting base, a housing slidably mounted on said supporting base for movement in a direction parallel to the axis of rotation of the grinding wheel, a first slide on said housing having a contour cam on one side thereof and movable transversely of the movement of said housing, a second slide on said housing and movable transversely of said first slide and having a follower on one side thereof in contact with said contour cam and a transfer cam in the other side thereof, a third slide on said housing movable parallel to said first slide and having a follower at each end thereof, one of said followers contacting said transfer cam, a work support slide slidably mounted on said housing and movable transversely of the movement of said first and third slides and the movement of said housing, and a ratio cam on said work support slide, the other of the followers on said third slide contacting said ratio cam.

3. Apparatus for holding and moving a work piece relative to a grinding wheel for forming a contour on said work piece, including a supporting member, a housing slidably mounted on said supporting member, a first slide in said housing having a feed cam on one side thereof and a contour cam on the other side thereof, a follower on said supporting member in contact with said feed cam, a second slide in said housing and movable parallel to said first slide and having a follower at one end thereof, a work support slide slidably mounted on said housing and movable transversely of the movement of said first and second slides, a ratio cam on said work support slide, the follower on said second slide contacting said ratio cam, and means coupled between said first and second slides for causing movement of said second and work support slides in accordance with the contour on said contour cam.

4. Apparatus for holding and moving a work piece relative to a radius contoured grinding wheel for forming a contour on said work piece, including a supporting base, a bridge support member mounted on and spanning said base, a housing mounted on said bridge support member and having a compartment within which said bridge support member is received, ball bearing assemblies on said bridge support member slidably supporting said housing thereon, a dust shield plate on said housing closing said compartment, and flexible dust shields connected between said housing and said bridge support member for shielding said ball bearing assemblies and wearing surfaces against grit and dust, a first slide on said housing having a feed cam on one side thereof and a contour cam on the other side thereof, a follower on said bridge support member in contact with said feed cam, a second slide on said housing and having a follower at an end thereof, a work support slide slidably mounted on said housing and movable transversely of the movement of said first and second slides, a ratio cam on said work support slide, the follower on said second slide contacting said contour cam, and means coupled between said first and second slides for causing movement of said second and work support slides in accordance with the contour and the contour cam.

5. Apparatus for holding and moving a work piece relative to a radius contour grinding wheel for forming a contour on said work piece, including a supporting member, a housing slidably mounted on said supporting member, a first slide in said housing having a feed cam on one side thereof and a contour cam on the other side thereof, a follower mounted on said supporting member and in contact with said feed cam, a second slide in said housing and movable transversely of said first slide and having a follower in one side thereof in contact with said contour cam and a transfer cam in the other side thereof, a third slide in said housing movable parallel to said first slide and having a follower at each end thereof, one of said followers contacting said transfer cam, a work support slide slidably mounted in said housing and movable transversely of the movement of said first and third slides, a ratio cam on said work support slide, the other of the followers on said third slide contacting said ratio cam, said first, second and third slides lying in spaced parallel planes.

6. Apparatus for holding and moving a work piece relative to a radius contour grinding wheel for forming a contour on said work piece, including a supporting member, a housing slidably mounted on said support member, a first slide in said housing having a feed cam on one side thereof and a contour cam on the other side thereof, a follower mounted on said supporting member and in contact with said feed cam, a second slide in said housing and movable transversely of said first slide and having a follower in one side thereof in contact with said contour cam and a transfer cam in the other side thereof, a third slide in said housing movable parallel to said first slide and having a follower at each end thereof, one of said followers contacting said transfer cam, a work support slide slidably mounted in said housing and movable transversely of the movement of said first and third slides, a ratio cam on said work support slide, the other of the followers on said third slide contacting said ratio cam, said first, second and third slides lying in spaced parallel planes, and a fluid pressure operated piston connected between said housing and said first slide for moving said first slide.

7. Apparatus for holding and moving a work piece relative to a radius contour grinding wheel for forming a contour on said work piece, including a supporting member, a housing slidably mounted on said supporting member, a first slide in said housing having a feed cam on one side thereof and a contour cam on the other side thereof, an adjustable follower mounted on said supporting member and in contact with said feed cam, a second slide on said housing and movable transversely of said first slide and having a follower in one side thereof in contact with said contour cam and a transfer cam in the other side thereof, a third slide on said housing and having a follower at each end thereof, one of said followers contacting said transfer cam, a work support slide slidably mounted on said housing and movable transversely of the movement of said first and third slides and said housing, a ratio cam on said work support slide, the other of the followers on said third slide contacting said ratio cam, and a fluid pressure operated mechanism connected between said housing and said first slide for moving said first slide.

8. Apparatus for holding and moving a work piece relative to a grinding wheel for forming a contour on said work piece, including a supporting member, a housing slidably mounted on said supporting member, a first slide in said housing having a contour cam on one side thereof, a follower and a feed cam on said supporting member and said first slide in contact with each other, a second slide in said housing and movable parallel to said first slide, a work support slide slidably mounted on said housing and movable transversely of the movement of said first and second slides, a ratio cam and a follower on said work support and on said second slide in contact with each other, and means coupled between said first and second slides for causing movement of said second and work support slides in accordance with the contour on said contour cam.

9. Apparatus for holding and moving a work piece relative to a grinding wheel for forming a contour on said work piece, including a supporting member, a housing slidably mounted on said supporting member, a first slide in said housing having a contour cam on one side thereof, a follower and a feed cam on said supporting member and on said first slide in contact with each other, a second slide in said housing and movable parallel to said first slide, a work support slide slidably mounted on said housing and movable transversely of the movement of said first and second slides, a ratio cam and a follower on said work support slide and on said second slide in contact with each other, and a third slide coupled between said first and second slides for causing movement of said second and work support slides in accordance with the contour on said contour cam, said third slide including a follower, said follower being in contact with said contour cam, and transfer cam and follower means on said second slide and said third slide in contact with each other.

References Cited by the Examiner
UNITED STATES PATENTS 2,434,834  1/48  Civitarese.

LESTER M. SWINGLE, *Primary Examiner*.